March 12, 1963 J. J. GEORGAS 3,080,927
ROTOR HEAD
Filed Jan. 4, 1960
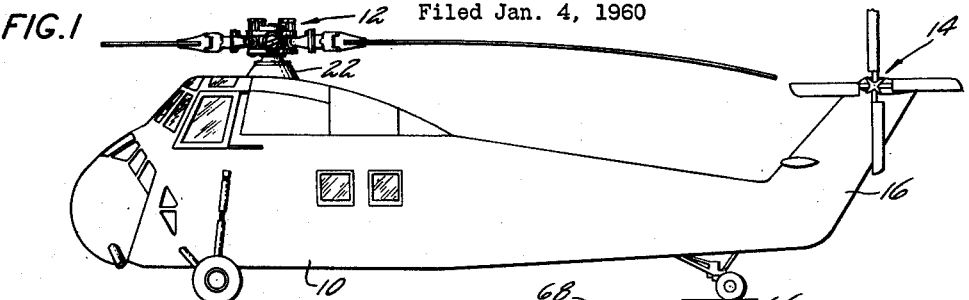
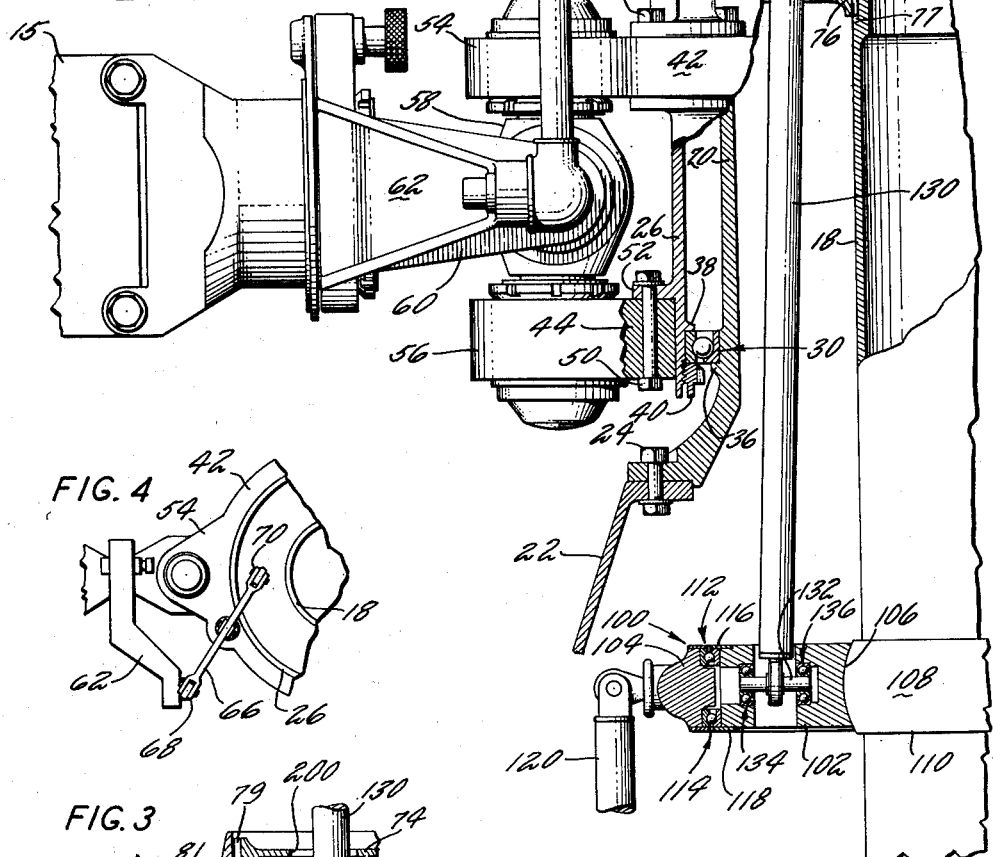
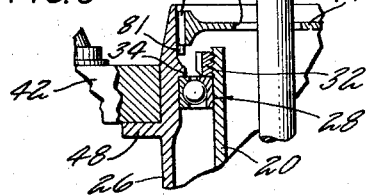
INVENTOR
JOHN J. GEORGAS
BY Jack N. McCarthy
AGENT

United States Patent Office 3,080,927
Patented Mar. 12, 1963

3,080,927
ROTOR HEAD
John J. Georgas, Stratford, Conn., assignor to United Aircraft Corporation, East Hartford, Conn., a corporation of Delaware
Filed Jan. 4, 1960, Ser. No. 226
12 Claims. (Cl. 170—160.25)

This invention relates to a rotor head for rotary wing aircraft.

An object of this invention is to provide a rotor head in which thrusts therethrough are transmitted directly to the airframe.

Another object of this invention is to provide a rotor head in which the loads applied to a fixed outer supporting member are static loads.

A further object of this invention is to provide a rotor head in which the transmission drive shaft thereto sustains no rotor head loads other than torque.

Another object of this invention is to provide a rotor head in which the control mechanism extends upwardly between a driving shaft and a fixed outer shaft.

A further object of this invention is to provide a control system in which a lever is pivotally mounted above the rotor head to transmit movement from a control rod connected to the lever at one end to an actuating rod connecting the other end of said lever to a pitch horn of a helicopter blade.

These and other objects and advantages of this invention will be apparent from the following detailed description of a specific embodiment of the invention shown in the accompanying drawings. In these drawings:

FIG. 1 is a side view of a helicopter on which this invention is shown;

FIG. 2 is an enlarged view of a section of the rotor head showing the connection of one rotor blade;

FIG. 3 is a fragmentary sectional view showing the driving connection between the inner shaft and outer shaft supporting member; and FIG. 4 is a plan view showing the relationship of the actuating lever and its two free ends and middle pivot point with respect to the drive and supporting shafts and blade.

The helicopter as shown has an extended fuselage 10, a single main sustaining rotor 12 and a torque compensating tail rotor 14 mounted on an upwardly extending pylon 16. Both rotors are driven by an engine located in the nose through a main gear box. An aircraft of this type is shown in U.S. Patent No. 2,818,224.

The gear box has a drive shaft 18 which extends upwardly therefrom and projects from the top of the fuselage of the aircraft. An annular supporting shaft member 20 is located around said drive shaft 18 and is bolted to an annular base member 22 which is fixed to aircraft structure and extends upwardly from the top thereof. The supporting shaft member 20 is bolted to annular base member 22 by a series of bolts 24 which project through two mating flanges on their respective parts.

The rotor 12 comprises a cylindrical member 26 which is mounted for rotation about the supporting shaft member 20 by a pair of bearing units 28 and 30. Bearing unit 28 has an inner and outer ring, the inner ring of which is fixed in position at the upper portion of member 20 and prevented from sliding over the top of said member by an annular nut 32. The outer ring is positioned within the upper cylindrical face of the interior of member 26 and engages an annular flange 34 which projects inwardly from cylindrical member 26. The lower bearing unit 30 has an inner and outer ring, the inner ring of which is fixed in position at the lower portion of the member 20. Member 20 has an outwardly extending flange 36 which projects on the underside of said inner ring. The inner rings of bearing units 28 and 30 can be positioned by an annular spacer located between said inner rings or by any other means. The other ring of said bearing unit is held between an annular flange 38 projecting inwardly from member 26 and an annular nut 40 which is threaded to the lower free end of member 26.

Spaced annular plates 42 and 44 are fixed to the cylindrical member 26. Plate 42 is fixed to the top of the cylindrical member by a plurality of bolts 46 to a flange 48 which projects radially outwardly from a point adjacent the top of said cylindrical member. Plate 44 is fixed to the bottom of the cylindrical member by a plurality of bolts 50 to a flange 52 which projects radially outwardly from a point adjacent the bottom of said cylindrical member. These plates have sets of radially extending arms 54 and 56, respectively, each set providing the support for an attached rotor blade 15. A drag hinge 58 is supported for pivotal movement between each set of extending arms 54, 56 and a flapping link 60 is attached to each drag hinge 58. A blade is attached to each flapping link by means which permit pitch changing movement of the blade. This blade mounting system is shown in U.S. Patent No. 2,638,994. A blade pitch changing horn 62 is attached to each blade so that movement of the horn will change the pitch of the blade.

Adjacent each projecting arm 54, a projection 64 is fixed to the annular plate 42 so that it extends upwardly therefrom. These projections can be fixed to the annular plate 42 by means of bolts such as shown in FIG. 2 or by any other means. A lever 66 is pivotally attached to the upper free end of each projection 64 and extends so that its one free end 68 is over the free end of a cooperating pitch control horn 62 and the other free end 70 of the lever is located over the rotor at a point between the shaft 18 and member 20. A link 72 is connected between the free end 68 of each lever 66 and the free end of its cooperating pitch control horn 62. The connection at each end of link 72 is of a ball-joint type.

A flat annular plate 74 is connected between the top of the drive shaft 18 and the top of the cylindrical member 26. The inner periphery of the annular plate 74 is enlarged at 76 and has splines 75 thereon projecting inwardly. These splines engage outwardly projecting splines 77 located on the upper end of the drive shaft 18. An annular nut 78 threadably secured to the end of drive shaft 18 holds the annular plate 74 in place. The outer periphery of plate 74 is enlarged and has splines 79 projecting outwardly therefrom. These splines engage inwardly extending splines 81 around the inner periphery of the upper end of cylindrical member 26.

A swash plate mechanism 100 is positioned around the drive shaft 18 within the annular base member 22. This swash plate mechanism 100 comprises a rotating member 102 and a stationary member 104. The rotating member 102 is formed having a spherical seat 106 about its inner periphery. This spherical seat engages an outer spherical surface 108 on a member 110 which is slidably mounted on drive shaft 18. This arrangement permits plate 102 to tilt around its spherical surface. The stationary member 104 comprises an annular ring which is mounted around the outer periphery of member 104 by the use of two ball bearing units 112 and 114. These bearing units are held in position by plates 116 and 118 which are fixed in position by any means desired. The usual push-pull rods 120 are connected to the member 104. These rods 120 can be actuated by an actuating means such as shown in U.S. Patent No. 2,720,271 or in U.S. Patent No. 2,811,212. Many other tyes of actuating means may be used.

A link 130 is connected between the free end 70 of each lever 66 and a point on the rotating member 102 of the swash plate mechanism 100. Each link 130 passes through a hole 200 in plate 74. The connection of the upper end of each link 130 to its cooperating end 70 of each lever 66 is of a ball-joint type. The lower end of each link 130 is connected to a pin 132 which is rotatably mounted in the rotating member 102 by two bearing units 134 and 136. The free end of link 130 is attached to the shaft 132 by a ball-joint type connection. The connection of the link 130 to the pin 132 is prevented from axial movement along the pin. This may be done by swedging the inner member to the shaft or providing stops along the shaft. Any other well-known means may be used. These stops are used to prevent the link 130 from engaging the rotating member 102 as it tilts.

It can be seen that as swash plate mechanism 100 is tilted by the movement of actuating rods 120, the links 130 will be positioned for a specific aircraft movement. This actuation just referred to is for cyclic pitch changes. Any movement by a link 130 is transferred to its lever 66 to link 72 which in turn moves the pitch horn of a blade. For changes in collective pitch, all of the rods 120 are moved together and member 110 is then slidably moved on the drive shaft 18. This moves all of the links 130 equally and therefore changes the pitch on all of the blades the same amount.

It is to be understood that the invention is not limited to the specific description above or to the specific figures, but may be used in other ways without departure from its spirit as defined by the following claims.

I claim:

1. In a helicopter having a fuselage, an upstanding hollow housing on said fuselage having an open upper end, a rotor journalled for rotation around the exterior of said housing, blades mounted on said rotor for pitch changing movement, a shaft extending upwardly into said hollow housing, means operatively connecting said shaft and said rotor, said last named connecting means extending over said housing at its open upper end, means located in said fuselage for changing blade pitch, and means connecting said blade pitch changing means to said blades, said last named means extending between said shaft and said hollow housing and through said means operatively connecting said rotor and said shaft.

2. In a helicopter having a fuselage, an upstanding hollow housing on said fuselage having an open upper end, a rotor journalled for rotation around the exterior of said housing, blades mounted on said rotor for pitch changing movement, a shaft extending upwardly into said hollow housing, plate means operatively connecting said shaft and said rotor, said last named plate connecting means extending over said housing at its open upper end, means located in said fuselage for changing blade pitch, and means connecting said blade pitch changing means to said blades, said last named means extending between said shaft and said hollow housing through openings in said plate means.

3. In a helicopter having a fuselage, an upstanding hollow housing on said fuselage having an open upper end, a rotor journalled for rotation around the exterior of said housing, blades mounted on said rotor for pitch changing movement, a shaft extending upwardly into said hollow housing, means operatively connecting said shaft and said rotor, said last named connecting means extending over said housing at its open upper end, means in said fuselage for changing blade pitch, and linkage means connecting said blade pitch changing means to said blades, said last named linkage means extending between said shaft and said hollow housing and through said means operatively connecting said rotor and said shaft.

4. In a helicopter having a fuselage, an upstanding hollow housing on said fuselage having an open upper end, a rotor journalled for rotation around the exterior of said housing, blades mounted on said rotor for pitch changing movement, a shaft extending upwardly into said hollow housing, means operatively connecting said shaft and said rotor, said last named connecting means extending over said housing at its open upper end, means located in said fuselage for changing blade pitch, and linkage means connecting said blade pitch changing means to said blades, said last named linkage means including a rod for each blade which extends between said shaft and said hollow housing and through a cooperating hole in said means operatively connecting said rotor and said shaft.

5. In a helicopter having a fuselage, an upstanding hollow housing on said fuselage having an open upper end, a rotor journalled for rotation around the exterior of said housing, blades mounted on said rotor for pitch changing movement, a shaft extending upwardly into said hollow housing, means operatively connecting said shaft and said rotor, said last named connecting means extending over said housing at its open upper end, means located in said fuselage for changing blade pitch, and linkage means connecting said blade pitch changing means to said blades, said last named linkage means extending between said shaft and hollow housing and through said means operatively connecting said rotor and said shaft, said linkage means including a projection extending from said rotor for each blade, a lever mounted on each projection, means attaching one end of each lever with its cooperating blade, and means attaching the other end of each lever with said pitch changing means.

6. In a helicopter having a fuselage, an upstanding hollow housing on said fuselage having an open upper end, a rotor journalled for rotation around the exterior of said housing, blades mounted on said rotor for pitch changing movement, a shaft extending upwardly into said hollow housing, means operatively connecting said shaft and said rotor, said last named connecting means extending over said housing at its open upper end, means located in said fuselage for changing blade pitch, and linkage means connecting said blade pitch changing means to said blades, said last named linkage means extending between said shaft and said hollow housing and through said means operatively connecting said rotor and said shaft, said linkage means including a projection extending from said rotor for each blade, a lever mounted on each projection, a rod attaching one end of each lever with its cooperating blade, and a rod attaching the other end of each lever with said pitch changing means.

7. In a helicopter having a fuselage, an upstanding hollow housing on said fuselage having an open upper end, a rotor journalled for rotation about the exterior of said housing, blades mounted on said rotor for pitch changing movement, a shaft extending upwardly into said hollow housing, plate means operatively connecting said shaft and said rotor, means located in said fuselage for changing blade pitch, and linkage means connecting said blade pitch changing means to said blades, said last named linkage means extending through openings in said plate means, said linkage means including a projection extending from said rotor for each blade, a lever mounted on each projection, means attaching one end of each lever with its cooperating blade, and means attaching the other end of each lever with said pitch changing means.

8. In a helicopter having a fuselage, an upstanding hollow housing on said fuselage having an open upper end, a rotor journalled for rotation around the exterior of said housing, blades mounted on said rotor for pitch changing movement, each blade having a pitch changing arm extending therefrom, a shaft extending upwardly into said hollow housing, means operatively connecting said shaft and said rotor, said last named connecting means extending over said housing at its open upper end, means located in said fuselage for changing blade pitch, a projection extending from said rotor for each blade, a lever pivotally mounted on each projection, a first rod connecting one end of each lever with its cooperating pitch changing arm, and a second rod extending between said shaft and said hollow housing and connecting the other end of each lever with said blade pitch changing means.

9. In a helicopter having a fuselage, an upstanding hollow housing on said fuselage having an open upper end, a rotor journalled for rotation about the exterior of said housing, blades mounted on said rotor for pitch changing movement, each blade having a pitch changing arm extending therefrom, a shaft extending upwardly into said hollow housing, plate means operatively connecting said shaft and said rotor, means located in said fuselage for changing blade pitch, a projection extending from said rotor for each blade, a lever pivotally mounted on each projection, a first rod connecting one end of each lever with its cooperating pitch changing arm, and a second rod connecting the other end of each lever with said blade pitch changing means, said plate means having holes therein, each second rod passing through a hole in said plate means.

10. In a helicopter having a fuselage, an upstanding hollow housing on said fuselage having an open upper end, a rotor journalled for rotation about the exterior of said housing, blades mounted on said rotor for pitch changing movement, each blade having a pitch changing arm extending therefrom, a shaft extending upwardly into said hollow housing, a plate operatively connecting said shaft and said rotor, said plate extending over the open upper end of said housing, said plate having holes therein, means located in said fuselage for changing blade pitch, a projection extending from said rotor for each blade, a lever pivotally mounted on each projection, a first rod connecting one end of each lever with its cooperating pitch changing arm, and a second rod connecting the other end of each lever with said blade pitch changing means, each second rod passing through a hole in said plate.

11. In a helicopter having a fuselage, an upstanding hollow housing on said fuselage having an open upper end, a rotor journalled for rotation around the exterior of said housing, blades mounted on said rotor for pitch changing movement, a shaft extending upwardly into said hollow housing, means operatively connecting said shaft and said rotor, said last named connecting means extending over said housing at its open upper end, means located on said shaft for changing blade pitch, and means connecting said blade pitch changing means to said blades, said last named means extending between said shaft and said housing and through said means operatively connecting said rotor and said shaft.

12. In a helicopter having a fuselage, an upstanding hollow housing on said fuselage having an open upper end, a rotor journalled for rotation around the exterior of said housing, blades mounted on said rotor for pitch changing movement, a shaft extending upwardly into said hollow housing, said shaft being coaxial with said rotor, means operatively connecting said shaft and said rotor, said last named connecting means extending over said housing at its open upper end, means located in said fuselage for changing blade pitch, and means connecting said blade pitch changing means to said blades, said last named means extending between said shaft and said hollow housing and through said means operatively connecting said rotor and said shaft.

References Cited in the file of this patent

UNITED STATES PATENTS

| | | |
|---|---|---|
| 2,080,522 | Wilford et al. | May 18, 1937 |
| 2,421,364 | Cierva | May 27, 1947 |
| 2,511,687 | Andrews | June 13, 1950 |
| 2,620,888 | Avery | Dec. 9, 1952 |
| 2,980,187 | Smyth-Davila | Apr. 18, 1961 |

FOREIGN PATENTS

| | | |
|---|---|---|
| 137,362 | Australia | May 23, 1950 |